(No Model.)
J. O. BROWN.
GUARD FINGER FOR CUTTER BARS OF MOWERS AND REAPERS.
No. 420,768. Patented Feb. 4, 1890.
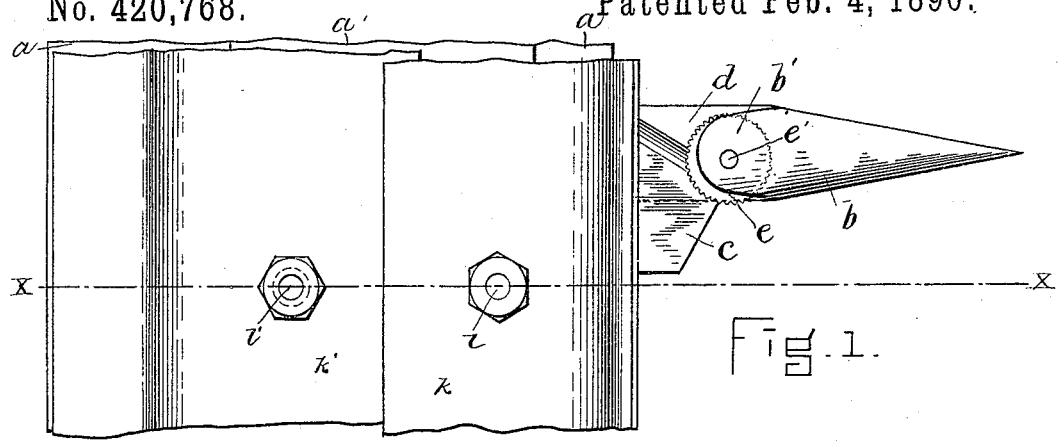
Fig. 1.
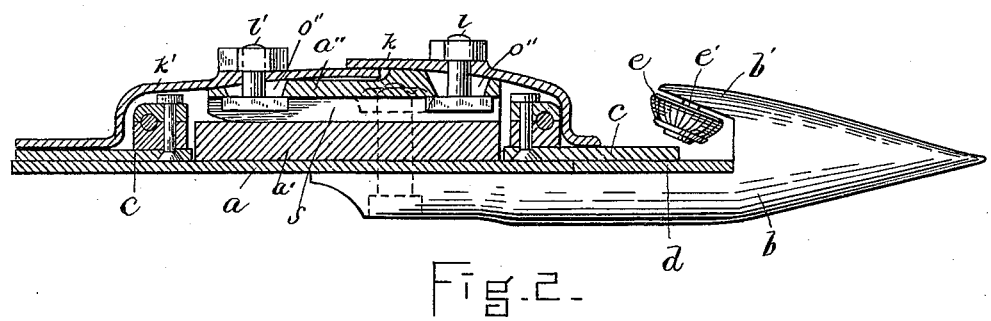
Fig. 2.
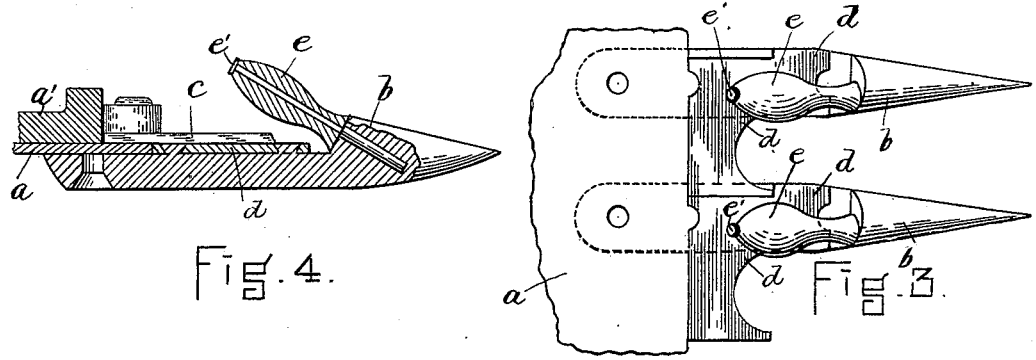
Fig. 4.
Fig. 3.
WITNESSES.
H. Brown
A. D. Harrison
INVENTOR.
J. O. Brown
by Wight Brown Quinby
Attys
N. PETERS, Photo-Lithographer, Washington, D. C.

UNITED STATES PATENT OFFICE.

JAMES O. BROWN, OF BOSTON, MASSACHUSETTS, ASSIGNOR TO THE BROWN SELF SHARPENING MOWING MACHINE COMPANY, OF SAME PLACE.

GUARD-FINGER FOR CUTTER-BARS OF MOWERS AND REAPERS.

SPECIFICATION forming part of Letters Patent No. 420,768, dated February 4, 1890.

Application filed May 28, 1888. Serial No. 275,291. (No model.)

*To all whom it may concern:*

Be it known that I, JAMES O. BROWN, of Boston, in the county of Suffolk and State of Massachusetts, have invented certain new and useful Improvements in Guard-Fingers for Cutter-Bars of Mowers and Reapers, of which the following is a specification.

This invention relates to the cutting apparatus of that class of mowers and reapers employing an endless chain or series of knives which are moved continuously around sprocket-wheels, the knives moving continuously in one direction under the guard-fingers of the finger-bar instead of reciprocating.

The invention has for its object to diminish the resistance caused by the frictional contact of the grass with the guard-fingers while the continuously-moving knives are pressing the grass against said fingers; and it consists in an anti-friction roller applied to a guard-finger above the knives, the periphery of said roller constituting a rolling surface that moves with the grass bearing against it, and thereby reduces the resistance and friction to the minimum, as I will now proceed to describe and claim.

In the accompanying drawings, forming a part of this specification, Figure 1 represents a top view of a portion of a finger-bar and a guard-finger thereon embodying my invention, together with adjacent parts. Fig. 2 represents a section on line $xx$, Fig. 1. Figs. 3 and 4 are views of a modification.

The same letters of reference indicate the same parts in all the figures.

In the drawings, $a$ represents the finger-bar of a mowing or reaping machine, said bar being of any suitable construction and provided with guard-fingers $b$, arranged at suitable intervals apart.

$c$ $c$ represent the knives, which are suitably connected or linked together to form an endless chain which is moved progressively by the power of the machine applied in any suitable way, the knives at the forward part co-operating with fixed ledger-plates $d$, arranged below the knives. The finger-bar is here shown as a thin plate $a$, attached to a stiff rib or bar $a'$, which extends longitudinally of the plate, the edges of said rib acting as guides for the knives $c$.

In Fig. 2 I show a cover applied to the finger-bar, said cover being composed of plates $k$ $k'$, secured to the rib $a'$ by bolts $l$ $l'$. The heads of said bolts are engaged with a slot or groove $s$ in a piece $a''$, which is secured to the upper surface of the bar $a'$, said piece having orifices $o''$, through which the shanks of said bolts pass. The said cover is intended to protect the knives and the links or devices which connect them in an endless chain.

The parts thus far described are not claimed in the present application.

In carrying out my invention I mount an anti-friction roller $e$ on each guard-finger above the knives, said roller being free to rotate loosely and arranged so that its rotating surface is in position to come in contact with the grass that is forced against the guard-finger by the continuously-moving knives without coming in contact with said knives. The grass, pressing against and moving along the surfaces of the rollers presented to it, causes the rollers to rotate, and thus greatly facilitates the passage of the grass, so that the resistance to the movement of the knives through the grass, caused by the friction of the grass on the guard-fingers, is materially less than it would be if the guard-fingers presented the usual non-rotating surfaces to the grass.

The form and arrangement of the rollers $e$ may be variously modified. In Figs. 1 and 2 I have shown a roller of a generally frusto-conical form mounted on a stud $e'$, extending obliquely downward from a lip $b'$ on the guard-finger. Figs. 3 and 4 show an elongated roller journaled on a stud $e'$, projecting diagonally upward from the guard-finger. Various other forms and arrangements may be adopted without departing from the spirit of my invention.

Another advantage of the rollers arranged as shown in Figs. 1 and 2 is as follows: The portions of the rollers which project forward of the knives act to feed the standing grass which comes in contact with said portions of the rollers toward the knives, the rollers having milled or roughened peripheries, which take hold of the grass.

I claim—

1. A guard-finger for the finger-bars of mowers and reapers provided with an antifriction roller located over the knives of the cutter and separated from said knives by an intervening space, said roller being arranged to oppose and be rotated by the grass which is forced against the guard-finger, as set forth.

2. A guard-finger having a fixed stud $e'$ located above the knives and a roller mounted to rotate loosely on said stud, with its periphery out of contact with the knives and arranged to oppose and be rotated by the grass which is forced against the guard-finger, as set forth.

3. In a mowing-machine, the combination, with the guard-fingers held on the finger-bar and each provided with a roller, of a knife-blade adapted to pass over each of said guard-fingers and under the said roller on each guard.

In testimony whereof I have signed my name to this specification, in the presence of two subscribing witnesses, this 25th day of May, A. D. 1888.

JAMES O. BROWN.

Witnesses:
C. F. BROWN,
A. D. HARRISON.